(12) United States Patent
Wears

(10) Patent No.: US 6,866,244 B2
(45) Date of Patent: Mar. 15, 2005

(54) BUSHING-LESS CONTROL VALVE

(75) Inventor: William E. Wears, Marshalltown, IA (US)

(73) Assignee: Fisher Controls International LLC, St. Louis, MO (US)

(*) Notice: Subject to any disclaimer, the term of this patent is extended or adjusted under 35 U.S.C. 154(b) by 0 days.

(21) Appl. No.: 10/360,979

(22) Filed: Feb. 7, 2003

(65) Prior Publication Data
US 2004/0155217 A1 Aug. 12, 2004

(51) Int. Cl.⁷ ............................. F16K 41/04; F16J 15/20
(52) U.S. Cl. ....................................... 251/214; 251/318
(58) Field of Search .......................... 251/214, 318–334

(56) References Cited

U.S. PATENT DOCUMENTS

| 1,463,169 | A |   | 7/1923  | Löwinger |         |
|-----------|---|---|---------|----------|---------|
| 3,467,357 | A |   | 9/1969  | Schomer et al. | 251/214 |
| 3,648,718 | A | * | 3/1972  | Curran   | 137/269 |
| 3,958,592 | A |   | 5/1976  | Wells et al. | 137/315 |
| 4,379,557 | A | * | 4/1983  | Saka     | 277/516 |
| 4,570,942 | A | * | 2/1986  | Diehl et al. | 277/540 |
| 4,792,119 | A | * | 12/1988 | Illy et al. | 251/333 |
| 5,791,629 | A |   | 8/1998  | Wears et al. | 251/214 |

FOREIGN PATENT DOCUMENTS

| DE | 93 15 995.1 | 3/1994 |
| GB | 2 066 906 A | 7/1981 |

OTHER PUBLICATIONS

International Search Report in PCT/US04/00327 dated May 24, 2004.

* cited by examiner

Primary Examiner—Paul J. Hirsch
(74) Attorney, Agent, or Firm—Marshall, Gerstein & Borun LLP

(57) ABSTRACT

A fluid control valve, in which the usual metal stem guide bushings have been eliminated, includes a valve bonnet and a packing nut threadably engaging the valve bonnet. A valve stem passes through the valve bonnet and the packing nut in a clearance fit so that there is no engagement therebetween. A single packing set is included, having a middle virgin PTFE sealing ring, a carbon or glass filled PTFE male packing ring on one side and a carbon or glass filled PTFE female ring on the other side. Belleville disk springs may be provided intermediate the packing nut and the packing set, for supplying live loading to the packing. The packing provides sufficient stem guidance, interference fit with the valve stem to enable the usual upper and lower metal guide bushings to be eliminated.

6 Claims, 3 Drawing Sheets

BUSHING-LESS CONTROL VALVE

BACKGROUND

This invention relates to fluid control valves, used to control the flow of liquids and/or gases, and in particular to apparatus for guiding a valve operating member such as a valve stem.

Fluid control valves, such as, for example, stem valves, typically include a valve body containing a valve seat, a valve plug attached to a movable valve stem, and an actuator mechanism for moving the valve plug via the valve stem. Typically, at least one bushing is used to assist in guiding the valve stem. However, U.S. Pat. No. 5,791,629, assigned to the same assignee as herein, discloses a fluid control valve that does not use any bushings to guide the valve stem. Instead, a pair of packing sets provides a sufficient stem guidance, interference fit with the valve stem to enable the usual upper and lower metal guide bushings to be eliminated.

SUMMARY

A fluid control valve includes a valve body having a fluid inlet, a fluid outlet, a passageway communicating therebetween, and valve seat in said passageway for controlling the fluid flow. The fluid flow control valve further includes a valve bonnet mounted to the valve body and having a central bore, and an elongated valve operating member extending through the valve bonnet central bore with a plug and for sealingly engaging the valve seat. The elongated valve operating member has no contact or engagement with the valve bonnet, as a lower clearance bore is provided between the valve bonnet and the elongated valve operating member. A single packing set is disposed in the valve bonnet central bore surrounding the elongated valve operating member, and is secured in place by an elongated packing nut that is threadably engaged to the valve bonnet. The single packing set provides the sole sealing means for stabilizing, sealing, and guiding the elongated valve operating member.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

Figure 1:
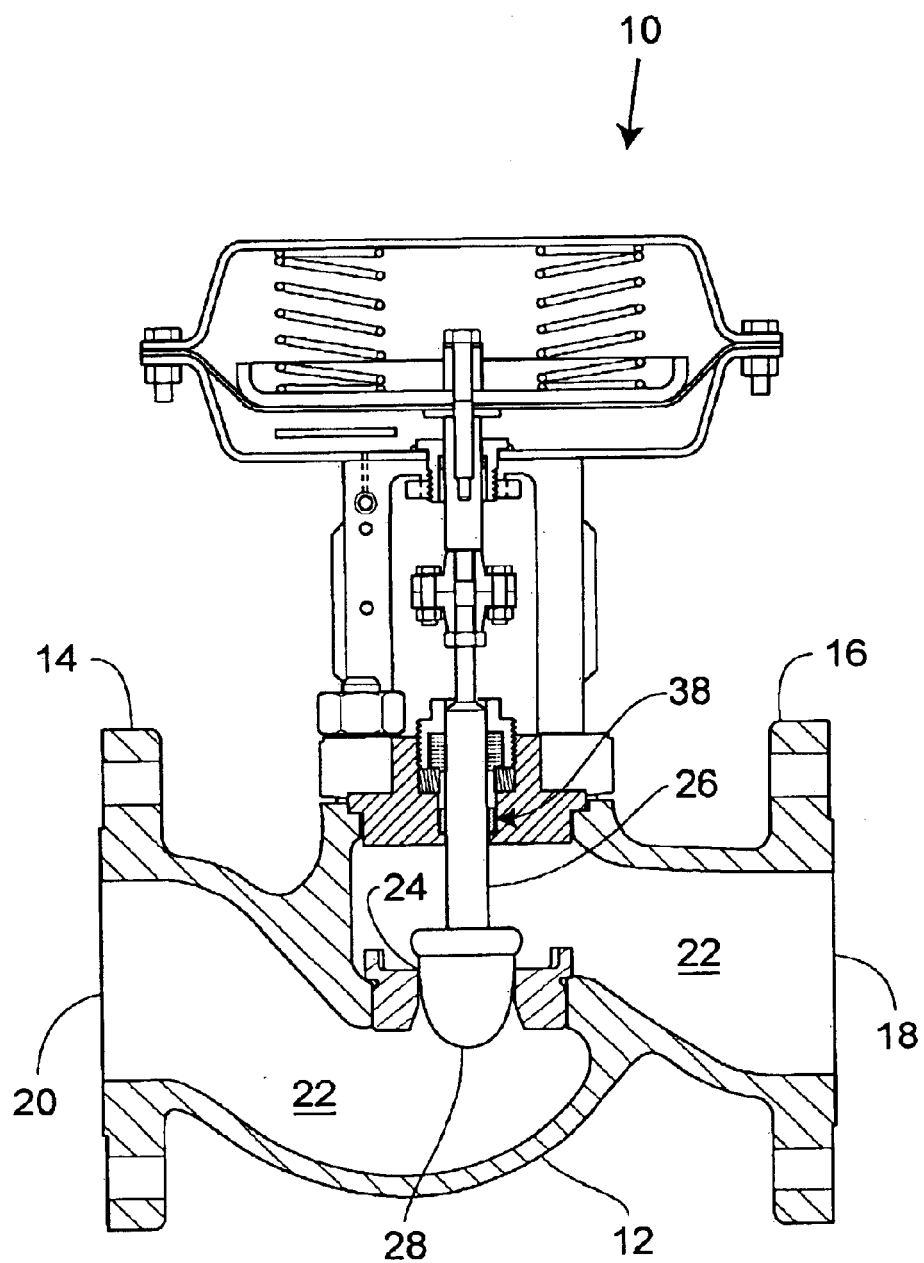
FIG. 1 is a cross-sectional view of a fluid control valve according to the invention.

FIG. 1 shows a fluid control valve 10 having a valve body 12 with opposite mounting flanges 14, 16 for mounting the valve 10, for instance, in a pipeline system. The valve body 12 also includes a fluid inlet 18 and a fluid outlet 20 with a passageway 22 communicating therebetween.

A valve seat 24 is provided in the passageway for controlling the fluid flow through the control valve 10 in response to the position of a valve operating member such as a valve stem 26 having a valve plug 28 at one end for sealing engagement with the valve seat 24.

Figure 2:
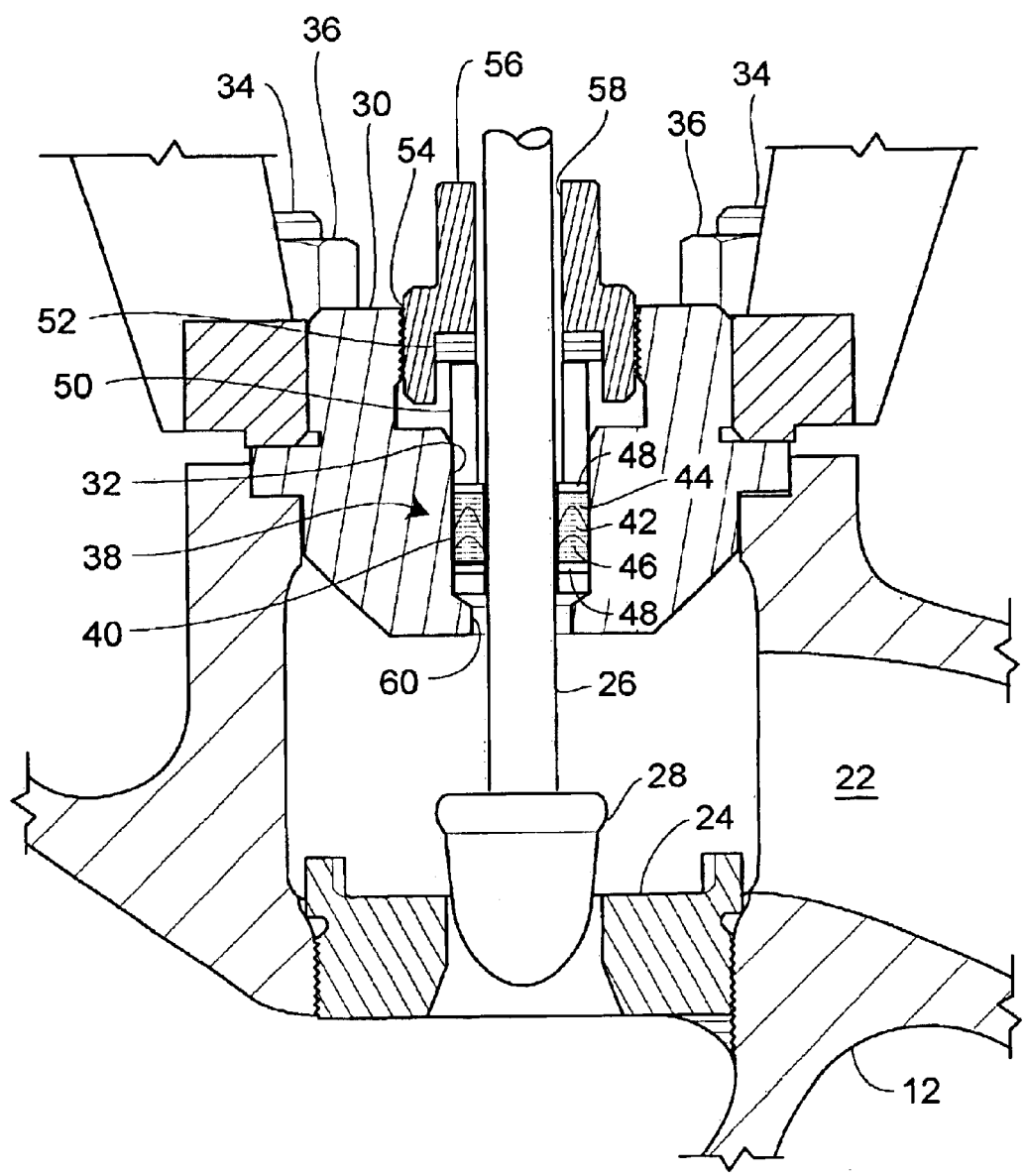
FIG. 2 is an enlarged cross-sectional view of a portion of the fluid control valve of FIG. 1.

As best seen in FIG. 2, a valve bonnet 30 has a central bore 32 and is securely mounted to the valve body 12 by a series of threaded studs 34 and mounting nuts 36. Within the central bore 32 there is provided a single packing assembly 38. The packing set assembly 38 may be a V-type packing set 40 with a middle PTFE sealing ring 42 sandwiched between a filled PTFE female ring 44 and a filled PTFE male ring 46. An anti-extrusion ring 48 may be disposed on each end of the packing set 40. It is preferred that the filled PTFE male and female rings 46 and 44 be formed of carbon or glass filled PTFE, whereas the middle sealing ring 42 may be formed of virgin PTFE. Of course, other types of packing materials may be used, such as, for example, graphite or graphite laminate, Kalrez® brand material, available from DuPont Dow Elastomers L.L.C. A spacer ring 50, formed of metal, such as stainless steel, is provided above the packing set assembly 38.

Above the spacer ring 50, there is provided a set of disk springs 52, such as Belleville disk springs. As shown in FIG. 2, the upper end of the valve bonnet 30 has inside threads for threadably engaging the threads 54 on a threaded packing nut 56 to provide a "live" compression load on the packing set 40. Further, as shown in FIG. 2, there is an upper clearance bore 58 within the packing nut 56 so that the inside diameter of the bore 58 is larger than the outside diameter of the valve stem 26. This ensures that as the valve stem operates within the valve, there is no engagement of the valve stem 26 with the packing nut 56.

Also, there is provided a lower clearance bore 60 between the valve stem 26 and the valve bonnet 30 such that the inside diameter of the bore 60 is larger than the outer diameter of the valve stem 26 to prevent engagement of the valve stem with the valve bonnet.

Similarly, there is provided a sufficient clearance between the valve stem 26 and the inside diameter of the spacer ring 50 so that there is no engagement of the valve stem with the spacer ring 50. Accordingly, neither the packing nut 56 nor the valve bonnet 30, nor the spacer ring 50 provide any guidance of the valve stem 26. While the Belleville disk springs 52 are provided with a close tolerance on their outside diameter with the central packing bore 32 within the valve body 30, the inside diameter of the Belleville springs 52 is sufficiently larger than the valve stem outside diameter to prevent any engagement therebetween. The anti-extrusion rings 48 have little or no clearance on their outside diameter adjacent to the valve bonnet and also on the inside diameter next to the valve stem. The carbon or glass filled male and female packing rings 46, 44 are provided to back the virgin PTFE sealing ring 42 and thereby keep it in place.

With the proper loading on the packing set assembly 38 there is provided a stem guide interference fit of the packing rings 42, 44, 46 in the packing set 38 with the valve stem 26. The function of the anti-extrusion rings 48 is to prevent loss of material of the male and female packing rings due to the movement of the valve stem and extend their life. The anti-extrusion rings 48 may be eliminated from the packing assembly 38, however, this may reduce the reliable operating life of the packing assembly 38.

Figure 3:
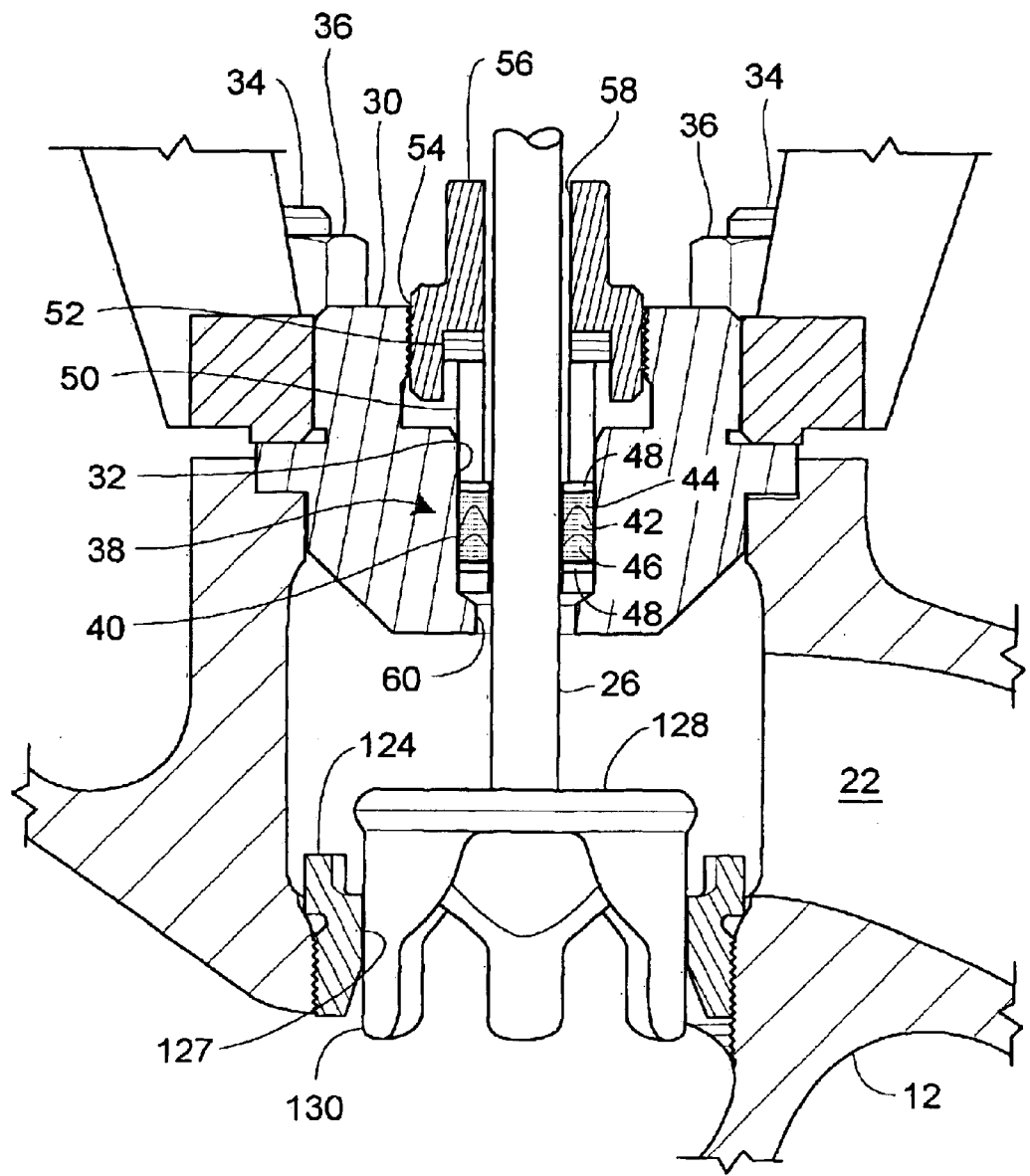
FIG. 3 is a cross-sectional view of a fluid control valve similar to that of FIG. 2, in accordance with a second embodiment of the invention.

FIG. 3 depicts a second embodiment in which a skirted valve plug 128 is used in place of the plug 28 of FIG. 2. The skirted valve plug 128 is intended primarily for larger flow line applications, in which higher side loads may be exerted on the stem 26. The skirted plug 128 includes a plug skirt portion 130 that is designed to stay in contact with an associated valve seat bore 127 associated with a valve seat 124, even when the valve stem 26 and the valve plug 128 are moved upward as oriented in FIG. 3 to a fully-open position, thereby providing additional guiding means for the valve stem 26.

While certain preferred embodiments have been described, it is recognized that variations may be made thereto that are still within the scope of the appended claims. For example, as an alternative to the packing nut 56, spacer ring 50, and disk springs 52, other ways of providing a compression load on the packing are certainly possible, such as by using a sleeve connected to a flange that may be pressed downwardly by one or more nuts threadably attached to bolts extending from the bonnet. Also, the disk springs 52 may be dispensed with if a live loading arrangement is not needed.

What is claimed:

1. A fluid control valve comprising:
   a valve body having a fluid inlet, a fluid outlet, a passageway communicating therebetween, and a valve seat in said passageway for controlling the fluid flow;
   a valve bonnet mounted to the valve body and having a central bore;
   an elongated valve operating member extending through said valve bonnet central bore with a plug end for sealingly engaging said valve seat, including a lower clearance bore between said valve bonnet and said elongated valve operating member so there is no engagement therebetween;
   a single packing set in said valve bonnet central bore surrounding said elongated valve operating member;
   said single packing set providing a guidance fit engagement between the valve bonnet and the valve operating member, without the need for a bushing between the valve bonnet and the valve operating member.

2. The fluid control valve of claim 1, wherein said single packing set is formed of a V-type PTFE packing ring including a PTFE sealing ring between opposite male and female filled PTFE packing rings.

3. The fluid control valve of claim 1, wherein the plug end includes a skirted valve plug.

4. A fluid control valve comprising:
   a valve body having a fluid inlet, a fluid outlet, a passageway communicating therebetween, and a valve seat in said passageway for controlling the fluid flow;
   a valve bonnet mounted to the valve body and having a central bore;
   an elongated valve operating member extending through said valve bonnet central bore with a plug end for sealingly engaging said valve seat, including a lower clearance bore between said valve bonnet and said elongated valve operating member so there is no engagement therebetween;
   an elongated packing nut threadably engaging the valve bonnet, including an upper clearance bore along the entire length thereof at all times between the packing nut and the valve operating member so there is no engagement therebetween;
   a single packing set in said valve bonnet central bore surrounding said elongated valve operating member;
   said single packing set including stabilizing and sealing means (1) for solely stabilizing and guiding the valve operating member within the valve bonnet central bore and the packing nut upper clearance bore by said single packing set providing a guidance fit engagement between the single packing set and the valve operating member, said guidance fit engagement between said single packing set and the valve operating member is solely sufficient to guide and stabilize the valve operating member from side loads applied to the valve operating member, and (2) for solely sealing the valve operating member and the valve bonnet central bore outer diameter by said single packing set providing a sealing engagement, said sealing engagement between said single packing set and said valve operating member being sufficient to provide said sealing engagement.

5. The fluid control valve of claim 4, wherein said single packing set is formed of a V-type PTFE packing ring including a PTFE sealing ring between opposite male and female filled PTFE packing rings.

6. The fluid control valve of claim 4, wherein the plug end includes a skirted valve plug.

* * * * *